Nov. 24, 1936.  H. L. TIGER  2,061,722
HYDROMETER
Filed Sept. 20, 1935
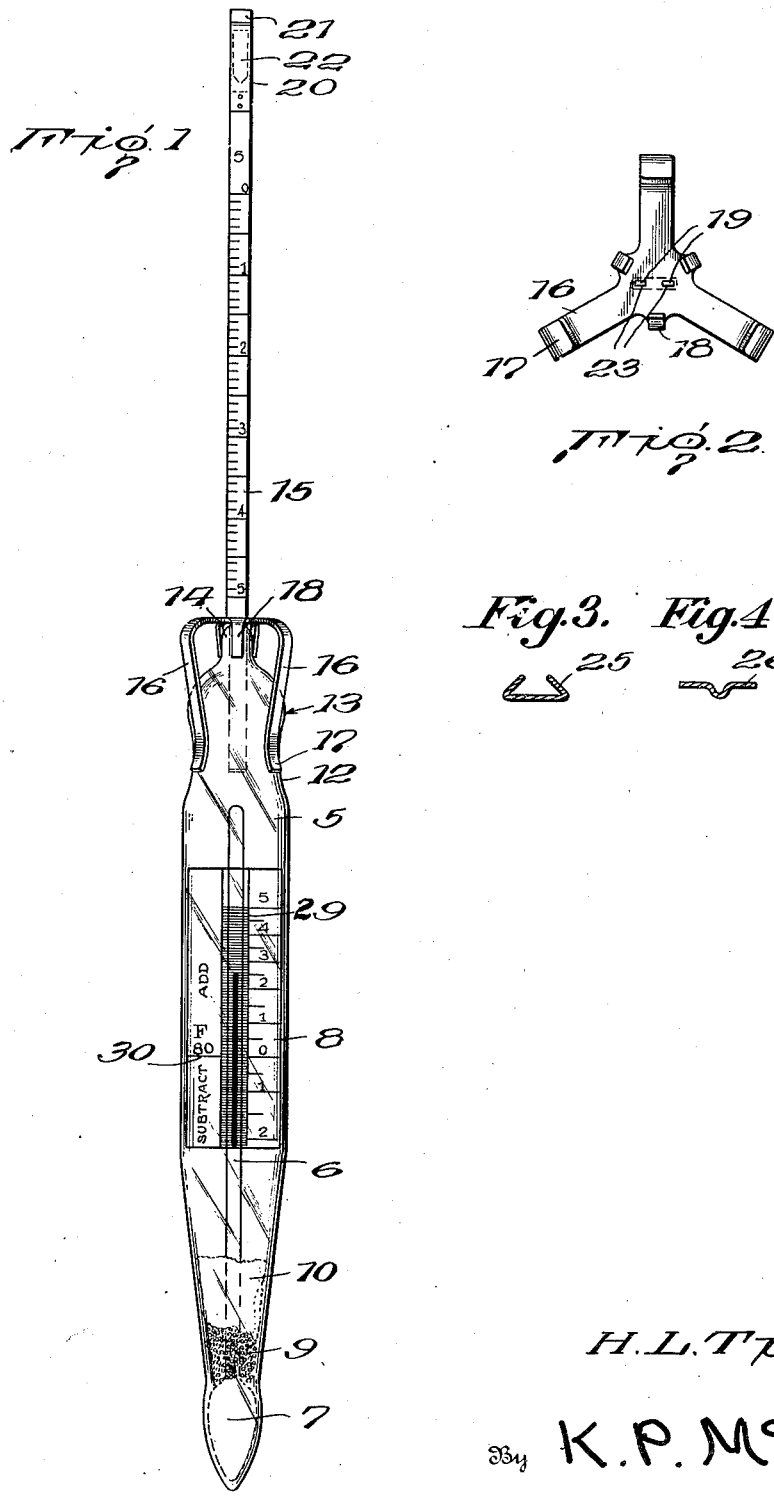
Inventor
H. L. Tiger,
By K. P. McElroy
Attorney Patented Nov. 24, 1936

2,061,722

UNITED STATES PATENT OFFICE 2,061,722

HYDROMETER

Howard L. Tiger, New York, N. Y., assignor to The Permutit Company, New York, N. Y., a corporation of Delaware Application September 20, 1935, Serial No. 41,462

6 Claims. (Cl. 265—46)

This invention relates to hydrometers; and it comprises a hydrometer of high and constant precision, particularly adapted for estimating the saline content of boiler waters, said hydrometer having a weighted glass float bulb contoured at its upper end to provide for clamping engagement, a thin vertical metal stem and clamping means carried by the stem and engaging the contoured portion of the float; all as more fully hereinafter set forth and as claimed.

In steam boiler practice the saline content of the water in the boiler is of great importance, it being desirable that it be within certain upper and lower limits. In routine operation of a boiler delivering steam and supplied with feed water containing salines, the concentration in the boiler liquor steadily increases. The upper permissible limit of saline concentration varies in different installations but there is always some limiting upper concentration of salines not to be exceeded. When this limiting concentration is approached boiler liquor is blown off. In boiler plants it is desirable to have a quick and ready means for measuring saline concentration in the boiler liquor and in the blow-off water. Specific gravity determinations are indicated, but the changes in specific gravity with increase in concentration are not great and the water is hot. Variations in temperature may mask entirely differences in specific gravity, as taken by a hydrometer due to varying concentrations of salines in the water. In using a hydrometer with hot water it is necessary to make simultaneously an accurate determination of temperature, the two readings being corrected by each other. It is also desirable for many purposes and necessary where small differences in density are to be determined that the hydrometer be extremely sensitive which in turn means that the volume of the submerged float shall be relatively large as compared with the thickness of the stem carrying the specific gravity indications. It is practicable to put a sensitive thermometer in the glass float but a glass stem thin enough to give sensitivity in operation on the float is entirely too fragile.

An object achieved in the present invention is the provision of a hydrometer of extreme sensitivity, this hydrometer consisting of a glass float carrying a thermometer and a thin metal stem engaging the float through clamping means giving accurate axial registry of the two portions and rigid attachment. The stem is made of one of the modern types of incorrodible metal; the "noble metal" type of alloys such as "stainless steel" (chromium iron alloys) and is a thin strip of metal wide enough to accommodate scale markings. It is ordinarily flat, that is plane faced to give a scale easily read. Stainless steel is a metal of considerable stiffness and strength and stems made from it are not easily bent or deformed even when quite thin. Still thinner stems may however be made by giving the steel ribbon an arcuate shape or providing some sort of longitudinal corrugation.

Graduations on the stem may be in any scale convenient, Baumé, specific gravity, Twaddell, Brix, etc. For boiler work it is usually convenient to graduate the scale in salinometric degrees; indicating grains per gallon. For this purpose it is convenient to use solutions of common salt, NaCl, as a basis as this can be readily recalculated either to Baumé or specific gravity.

In most boilers, the allowable concentration rarely exceeds 1.5 per cent of salts, which is equivalent to a density or specific gravity of about 1.5° Bé. or a 1.5 solution of NaCl. A solution containing 1 per cent NaCl is 1° Bé. or 1.007 specific gravity at 60° F. In a 1 per cent solution there are 10,000 ppm. of salt or 583 grains per gallon since 17.1 ppm. corresponds to 1 grain per gallon.

In the glass float of the hydrometer of the present invention it is usual to include not only the thermometer but a calibrated scale enabling quick correction of densities for temperatures.

In practical embodiments of the present invention the stem is retained on the bulb by spring clamp means engaging an annular groove surmounted by a bulge or protuberance on the upper part of the bulb. With this particular contour, a circumferential groove is the most convenient way of securing engagement. The stem is provided at its lower end with clips engaging the groove and also with small centering clips for engaging a nipple on the top of the bulb. With this arrangement the stem is rigidly held to the bulb and is exactly centered axially but can be readily removed. Engagement, however, is rigid and positive.

In the accompanying drawing I have shown, more or less diagrammatically, an example of a specific embodiment of my invention. In the showings, Fig. 1 is an elevational view of the complete hydrometer;

Fig. 2 is a plan view of the stem and clamp means, looking upward, and

Figs. 3, 4, and 5 show three optional cross sectional shapes for the stem.

In the figures, in which like reference characters indicate like parts throughout, the instrument is shown as having a cigar-shaped glass bulb 5 hermetically sealed. The shape of the lower portion of the bulb is not particularly material so far as the present invention is concerned. Inside the bulb is a mercury thermometer tube 6 communicating with a mercury bulb 7 at the lower end of the float bulb. A calibrated scale 8 for correction of the density by temperature is fixed in the float bulb. Provision of the thermometer in the bulb allows temperature to be quickly and accurately measured simultaneously with the density and in the same region of the liquid. Loading material, advantageously consisting of fine shot 9 is sealed into the lower part of the bulb with sealing material 10.

The upper portion of the bulb is, as shown, provided with a shallow, annular constriction or groove 12 which defines an upper bulged portion or protuberance 13. A nipple 14 is formed above portion 13, at the top of the bulb.

The stem comprises a metal rod 15 of rectangular cross section having a graduated scale, as shown. For boiler control work the scale advantageously reads in Baumé degrees. For other work, specific gravity readings are desirable. To the lower end of the rod is fixed a spider having a plurality of bent spring clips 16 having prong portions 17 engaging the groove in the bulb. The spider has also integral therewith three small clips 18 adapted to grip the nipple. The clips cooperate with the nipple to center the stem accurately on the bulb.

Other contours than those described can be utilized for the upper portion of the bulb, the clip means taking a form appropriate to the contour, but the shape shown is convenient in manufacture and use.

Fig. 2, which is a plan view of the detachable stem looking upward, shows how the spider is fixed to the stem. The lower end of the stem is provided with two squared pins 19 passed through corresponding squared holes 23 in the spider and riveted. The rivet joint if desired may be supplemented by welding, or by soldering with a metal noble to the solutions for which the hydrometer is used.

The spider is conveniently made in a single piece by stamping out sheet metal, and then bending the clip arms over as in Fig. 2. If desired, it can be formed integral with the stem. The springiness of the clips is so adjusted that the stem may be slipped on the glass bulb without the use of sufficient force to endanger it or to impede ready removal but giving an engagement which is rigid and positive. The clips are retained to the bulb by friction and by the protuberance, as shown. Clips 16 and 18 should be adjusted so that the stem is accurately centered and alined with the bulb. The adjustment of the spacing between the stem and the bulb is not critical, since the position of the submerged bulb with respect to the stem has no effect, within wide limits, upon the density readings.

At the upper end of the stem is fixed a small cylinder 20 provided with a removable plug 21 and adapted to contain a quantity of ballast 22, which may be fine shot retained with cotton. This means allows fine adjustments to be made, the mass of shot in the bulb being for the initial or coarse adjustment. In constructing a hydrometer, the weighted bulb is purposely made a little light, so that final adjustment can be made by adding ballast to the cylinder. It is inexpedient to try to secure the final adjustment by addition of shot to bulb 5 alone. This is because of inevitable variations in volume from one bulb to another.

In lieu of this arrangement the ballast cylinder (20) can be omitted, the stem made a little heavy, and metal filed from the stem to make the final adjustment. But the ballast arrangement described is on the whole more convenient.

The sensitivity of any hydrometer is inversely proportional to the cross sectional area of the stem. The instrument of Figs. 1 and 2 has a solid stem of small rectangular plane faced cross section. As stated, a still thinner stem may be made by bending the strip to give a channel or grooved cross section. Figs. 3, 4, and 5 show cross sections of stems having three of many possible cross sectional shapes: a three-sided channel 25 (Fig. 3), a corrugated strip 26 (Fig. 4) and an open-sided oval channel 27 (Fig. 5). In forms such as shown in Figs. 3 and 5 the channel is always left open, as shown. A sealed tube has the same effective cross sectional area as a solid rod of the same size and does not present advantages over a rod.

The stem and other metal parts are made of a metal noble to the solutions to be tested. For the present purposes chromium-iron alloys such as that commercially known as "stainless steel", are, as stated generally used. The metal is highly polished, to prevent errors due to "sticking"; adherence of a liquid film to the stem adjacent the point where the stem is submerged in the liquid. Errors due to sticking on ordinary metal stems may be equivalent to as much as 10 to 40 grains per gallon saline content; a substantial error.

Stainless steel not only has the requisite strength and permanence but also allows the stem graduations to be formed in an advantageous manner: by etching the graduations in the metal. Optionally, the graduations may be formed by plating the stem, marking the graduations with acid-resistant ink and then etching with acid; or, with sheet metal stems, by stamping the graduations so that they appear in relief.

In operation, the instrument is placed in the liquid to be tested and sinks to a level corresponding to one of the graduations on the stem. If the temperature be exactly that for which the instrument is calibrated, no correction need be applied but if the temperature be different, a correction is taken from the scale for the thermometer. As shown, an index mark 30 is provided on scale 8, corresponding to the arbitrarily set temperature at which the hydrometer stem scale gives true readings. There is also provided a correction scale 29, having marked thereon graduations indicating the correction to be applied to the stem scale reading when the temperature is above or below standard. This scale is advantageously calibrated not in temperature degrees but in degrees indicating density, correction factor units. That is, the markings give the correction, in salinometric degrees, to be added to or subtracted from the reading in the stem scale, when the temperature is above or below standard.

The instrument has a precision equivalent to plus or minus 10 grains NaCl per gallon (equivalent to a change in specific gravity equal to 0.00012) and has an even higher sensitivity. This is much higher than in conventional all-glass instruments and is due primarily to the fact that the stem is of polished, incorrodible metal enabling a small cross sectional area. What is equally important, the instrument retains its accuracy indefinitely, even in the presence of hot corrosive liquids. If in the course of long service the bulb should corrode from attack by the caustic liquors, it is a simple matter to readjust the hydrometer by adding a little shot to the upper tube.

What I claim is:

1. A hydrometer comprising a sealed float bulb contoured in its upper portion to provide for clamping engagement, a thin vertical metal stem and means on the stem for resiliently gripping the bulb, the gripping means engaging the clampable contour.

2. A hydrometer comprising a sealed, weighted float bulb of elongated cylindrical shape and having an annular groove near its upper portion and a nipple at its upper end, and a thin vertical metal stem having means for gripping the bulb at the groove and means for engaging the nipple.

3. A hydrometer comprising a sealed, weighted glass float bulb of generally cylindrical form, having a groove in its upper portion and a nipple at the top of the bulb, a thin, vertical stem of incorrodible metal, a small reservoir for ballast at the top of the stem, and a unitary spider clip member attached to the lower portion of the stem having a plurality of resilient clips for gripping the bulb at the groove and also having means for engaging the nipple.

4. A hydrometer comprising a sealed float bulb provided with an upper protruding tip, a thin, vertical metal stem and metal means on the stem for resiliently gripping the bulb below the tip and for gripping the tip so as to center the stem with respect to the tip.

5. A hydrometer comprising a sealed float bulb provided with a protuberance in its upper portion and containing a thermometer and a scale, a thin vertical metal stem graduated in density units and metal means on the stem for gripping the upper portion of the bulb and the protuberance so as to keep the stem vertically centered on the bulb.

6. A hydrometer particularly adapted for determining the saline content of hot water, said hydrometer comprising a glass bulb with a weighted lower end and a top provided with an annular groove, a thermometer within the bulb, a scale for correcting density by temperature also within the bulb, a thin metal stem provided with markings indicating specific gravity and finger-like clamping means carried by the stem and engaging the bulb in the groove.

HOWARD L. TIGER.